(12) United States Patent
Horio et al.

(10) Patent No.: US 8,075,984 B2
(45) Date of Patent: Dec. 13, 2011

(54) THERMOPLASTIC RESIN COMPOSITION AND FORMED ARTICLE USING THE SAME

(75) Inventors: Yoshihiko Horio, Ichihara (JP); Hiroshi Kawato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 11/587,338

(22) PCT Filed: Apr. 20, 2005

(86) PCT No.: PCT/JP2005/007550
§ 371 (c)(1),
(2), (4) Date: Oct. 24, 2006

(87) PCT Pub. No.: WO2005/103159
PCT Pub. Date: Nov. 3, 2005

(65) Prior Publication Data
US 2008/0014376 A1    Jan. 17, 2008

(30) Foreign Application Priority Data

Apr. 26, 2004    (JP) ................................ 2004-129565

(51) Int. Cl.
*B32B 7/02* (2006.01)
(52) U.S. Cl. ............ 428/212; 428/220; 524/88; 524/611
(58) Field of Classification Search .................. 428/1.6, 428/220, 212; 524/88, 611
See application file for complete search history.

(56) References Cited

U.S. PATENT DOCUMENTS 3,733,296 A * 5/1973 Cleveland et al. ............ 524/120
5,837,757 A * 11/1998 Nodera et al. .................. 524/87
6,941,057 B1 * 9/2005 Okamoto et al. ............. 385/143

FOREIGN PATENT DOCUMENTS

| JP | 09-330048 | 12/1997 |
| JP | 2001 302872 | 10/2001 |
| WO | WO 2004/020522 | 3/2004 |

* cited by examiner

*Primary Examiner* — David Sample
*Assistant Examiner* — Lawrence D Ferguson
(74) *Attorney, Agent, or Firm* — Oblon, Spivak, McClelland, Maier & Neustadt, L.L.P.

(57) ABSTRACT

The present invention provides a thermoplastic resin composition characterized by comprising (A) a thermoplastic resin and (B) a white pigment in a mass ratio of 50:50 to 90:10 and further comprising (C) a black coloring material and a blue coloring material; and provides a formed article using the resin composition. The above thermoplastic resin composition is an improvement of the conventional technique for preventing the permeation of light from a thin part of the formed article while securing a satisfactory reflectance, and can markedly improve the light blocking effect of a thermoplastic resin composition, without the increase of the number of parts, the employment of a more complicated process, or the like.

18 Claims, No Drawings

THERMOPLASTIC RESIN COMPOSITION AND FORMED ARTICLE USING THE SAME

TECHNICAL FIELD

The present invention relates to a thermoplastic resin composition and to a molded article using such a composition. More specifically, the present invention is directed to a thermoplastic resin composition exhibiting a high light shielding effect while ensuring a satisfactory reflectance and to a molded article obtainable by molding the thermoplastic resin composition.

BACKGROUND ART

A polycarbonate resin is widely utilized as an engineering plastic in a variety of fields, such as a field of office automation appliances and electric or electronic appliances and a field of automobiles, because of its excellent mechanical strengths (particularly impact resistance), electric characteristics and transparency. In recent years, utilization of liquid crystal displays (LCDs) has been expanded to note type personal computers, monitors and televisions. With such an expansion, an improvement of image quality is progressed. Thus, a backlight unit which is an illuminator for LCDs is required to have a higher brightness.

On the other hand, as typical in size reduction of note type personal computers, a thickness reduction of backlights is simultaneously being made. Thus, housings, flames and reflecting plates of those articles are required to have a high reflectance and to ensure a sufficient light shielding property even when they have a thin thickness.

However, as the thickness of molded articles decreases, the light shielding effect is reduced and, therefore, light more easily permeates therethrough. For example, the thickness of a frame of recent note type personal computers has been reduced to 0.5 mm in minimum. In order to prevent lack of hiding, it is thus necessary to take a special measure such as application of a black light-shielding tape to a necessary portion or, in another case, use of a white molded article in combination with a black molded article. Such measures result in complicated fabrication steps, increase of costs and hindrance to free design.

For example, a proposal has been made to incorporate titanium oxide in a composition for a housing of an illuminating device, which also functions as a reflector for reflecting a light incident from a light source disposed in the illuminating device, for the purpose of improving its light shielding property and of ensuring a sufficiency light shielding effect so long as the thickness thereof is about 1 mm or more (Patent Document 1). When the thickness is further reduced, however, a larger amount of titanium oxide must be used in order to obtain a higher light shielding effect. In this case, an increase of coloration or occurrence of silvering (silver stripes) a polycarbonate is unavoidable during the molding work due to reactive groups on surfaces of titanium oxide, even when a stabilizer is added.

A technique in which a laminate film having a light shielding layer is produced by coextrusion (Patent Document 2) and a technique in which a black film is laminated on a rear side of a white reflecting film (Patent Document 3) are also proposed. Such techniques have defects that lead to complicated works and an increase in number of parts.

A spacer for an electro-optical panel which contains a manganese oxide-based black pigment for the purpose of absorbing light is also proposed (Patent Document 4). In this case, since light absorption inevitably accompanies a decrease of light reflection, an illuminator having a molded article in which such a black pigment is used has a defect that leads to a reduction of the luminance thereof.

Patent Document 1: Japanese Patent Application Laid-Open No. H09(1997)-330048
Patent Document 2: Japanese Patent Application Laid-Open No. 2003-305811
Patent Document 3: Japanese Patent Application Laid-Open No. 2004-053759
Patent Document 4: Japanese Patent Application Laid-Open No. 2004-046205

DISCLOSURE OF THE INVENTION

The present invention has been made in view of the above circumstance and an object of the present invention is to provide a thermoplastic resin composition which exhibits a high light shielding effect (namely a low total light ray transmittance) while ensuring good reflectance and to provide a molded article using such a composition.

The present inventors have repeatedly made intensive studies with a view toward accomplishing the above object and have found effectiveness of the incorporation of a combination of a black coloring material with a blue coloring material into a resin composition containing a thermoplastic resin and a white pigment such as titanium oxide. The present invention has been completed on the basis of the above finding. Thus, the present invention has the following constitution:

1. A thermoplastic resin composition containing (A) a thermoplastic resin and (B) a white pigment in a mass ratio of the former to the latter of 50:50 to 90:10, characterized in that the composition also contains (C) a black coloring material and a blue coloring material.
2. A thermoplastic resin composition as defined in item 1 above, wherein the thermoplastic resin as component (A) is a polycarbonate resin.
3. A thermoplastic resin composition as defined in item 1 or 2 above, wherein the white pigment as component (B) is a titanium oxide powder.
4. A thermoplastic resin composition as defined in any one of items 1 to 3 above, wherein the black pigment and the blue pigment of component (C) are carbon black and phthalocyanine blue, respectively.
5. A thermoplastic resin composition as defined in any one of items 1 to 4 above, wherein component (C) is present in an amount of 0.1 to 50 ppm by mass based on a total mass of component (A) and component (B).
6. A thermoplastic resin composition as defined in any one of items 1 to 4 above, wherein component (C) is present in an amount of 1 to 50 ppm by mass based on a total mass of component (A) and component (B).
7. A thermoplastic resin composition as defined in any one of items 1 to 6 above, wherein a ratio by mass of the black pigment to the blue pigment is from 30:70 to 70:30.
8. A thermoplastic resin composition as defined in any one of items 1 to 7 above, wherein the thermoplastic resin composition has such optical characteristics that a molded article obtained by molding the thermoplastic composition and having a wall thickness of 0.5 mm has an entire light ray transmittance of 0.2 or less and a reflectance (Y-value) of 79 or more.
9. A molded article obtainable by molding a thermoplastic resin composition as defined in any one of items 1 to 8 above and having a wall thickness of 0.5 mm, characterized in that the molded article has an entire light ray transmittance of 0.2 or less and a reflectance (Y-value) of 79 or more.

10. A molded article obtainable by molding a thermoplastic resin composition as defined in any one of items 1 to 8 above and having a wall thickness of 1.0 mm, characterized in that the molded article has an entire light ray transmittance of 0.2 or less and a reflectance (Y-value) of 90 or more.

11. A part mounted on a liquid crystal display, characterized in that the part comprises a molded article as defined in 9 or 10 above.

BEST MODE FOR CARRYING OUT THE INVENTION

As the thermoplastic resin used as component (A) of the thermoplastic resin composition of the present invention, there may be mentioned, for example, polycarbonate resins, polycarbonate-polyorganosiloxane copolymers (hereinafter occasionally referred to as PC-PDMS copolymers for brevity), acrylic resins, polystyrene resins (transparent type) and polymethylpentene-1. These thermoplastic resins may be used singly or may be used in combination of two or more thereof. From the standpoint of improved average luminance when compounded with a white pigment such as titanium oxide, the thermoplastic resin is desired to have a high transparency. Thus, polycarbonate resins; mixtures of polycarbonate resins with PC-PDMS copolymers; acrylic resins such as polymethyl methacrylate; and mixtures of polycarbonate resins with acrylic resins such as polymethyl methacrylate are preferred.

Of these resins, the use of a polycarbonate resin by itself or the use of a thermoplastic resin containing at least 50% by mass of a polycarbonate resin is preferable for the purpose of ensuring mechanical strengths.

The kind of the polycarbonate resin which is easily produced by reacting a dihydric phenol with phosgene or a carbonic ester compound in the presence of an acid receptor and a chain terminator is not specifically limited.

As the dihydric phenol, there may be mentioned, for example, hydroquinone, 4,4'-dihydroxydiphenyl, bis(4-hydroxyphenyl)alkane, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)ketone, 9,9-bis(4-hydroxyphenyl)fluorene and halogenated derivatives thereof. Above all, bisphenol A, namely 2,2-bis(4-hydroxyphenyl)propane is suitable.

As the carbonic ester compound, there may be mentioned diaryl carbonate such as diphenyl carbonate and dialkyl carbonates such as diethyl carbonate and dimethyl carbonate.

As the chain terminator, a chain terminator having any structure may be used as long as it is a monohydric phenol. There is no further limitation thereon. Concrete examples of the chain terminator include p-tert-butylphenol, p-tert-octylphenol, p-cumylphenol, phenol, p-tert-amylphenol, p-nonylphenol, p-cresol, tribromophenol, p-bromophenol, 4-hydroxybenzophenone, etc. The chain terminators may be used singly or in combination of two or more thereof.

As the polycarbonate resin, there may be used a resin having a branched structure. As a branching agent for obtaining a polycarbonate resin having a branched structure, a compound having three or more functional groups, such as 1,1,1-tris(4-hydroxyphenyl)ethane, α,α',α''-tris(4-hydroxyphenyl)-1,3,5-triisopropylbenzene, 1-(α-methyl-α-(4''-hydroxyphenyl)ethyl)-4-(α,α'-bis(4''-hydroxyphenyl)ethyl)benzene phloroglucin, trimellitic acid and isatin bis(o-cresol) may be suitably used.

When a polycarbonate resin is used as the thermoplastic resin, it is preferred that the polycarbonate resin have a viscosity average molecular weight of 10,000 to 40,000. A viscosity average molecular weight of 10,000 or more can prevent a reduction in impact strength of a molded article obtained therefrom, while a viscosity average molecular weight of 40,000 or less permits the resin molding process to be performed without difficulty. From this point of view, the viscosity average molecular weight of the polycarbonate resin is more preferably 12,000 to 35,000, still more preferably 15,000 to 30,000.

The PC-DMS copolymer is a block copolymer having a polyorganosiloxane moiety and a viscosity average molecular weight of preferably 10,000 to 40,000, more preferably 12,000 to 35,000. Such a PC-PDMS copolymer may be produced by, for example, interfacial polycondensation of a previously prepared polycarbonate oligomer (hereinafter referred to as PC oligomer for brevity) having a polycarbonate moiety with a polyorganosiloxane (such as a polydialkylsiloxane, e.g. polydimethylsiloxane (PDMS) or polydimethylsiloxane, or polymethylphenylsiloxane) having a reactive group at a terminus of a polyorganosiloxane moiety.

The acrylic resin is a general term of polymers of acrylic acid or their derivatives, which include polymers and copolymers such as acrylic acid, esters of acrylic acid, acrylamide, acrylonitrile, methacrylic acid and esters of methacrylic acid. The acrylic resin preferably has a viscosity average molecular weight of 100,000 to 600,000, more preferably 150,000 to 500,000.

Next, the white pigment used as component (B) is preferably a powder of an inorganic filler such as titanium oxide, zinc oxide, calcium carbonate, barium sulfate or talc and may be selected in response to demand of the article. These white pigments may be used singly or in combination of two or more thereof. Above all, a powder of titanium oxide is preferable for reasons of capability of imparting a light reflecting function.

The titanium oxide powder may be either rutile type or anatase type. However, for reasons of excellent thermal stability and weatherability, rutile type is preferred. It is preferred that the titanium oxide powder be subject to a surface treatment with a surface treating agent of various types and be coated therewith for reasons of preventing thermal decomposition of the thermoplastic resin. Hydrated aluminum, silica, zinc, etc. may be generally used as the surface treating agent.

The shape of the titanium oxide powder is not specifically limited and may be suitably selected from scale-like forms, spherical forms, indeterminate forms and the like forms. The size (particle diameter) of the titanium oxide powder is preferably about 0.2 to about 5 μm. For the purpose of improving dispersibility of the titanium oxide powder in a resin, silicone oil, polyol, etc. may be used.

In the composition of the present invention, the content proportion of the thermoplastic resin as component (A) and white pigment as component (B) is so selected as to provide a mass ratio of the latter to the former 50:50 to 90:10. When the amount of the white pigment is less than the above range, the entire light ray transmittance at a wall thickness of 0.5 mm is high and it is difficult to obtain a molded article having a light shielding property and an entire light ray transmittance of 0.2% or less. When the amount of the white pigment is greater than the above range, on the other hand, both extremely high reflectance and light shielding effect can be ensured. However, the resin is considerably deteriorated especially when titanium oxide powder is added. Therefore, silvering (formation of silver streaks) significantly occurs during the molding of the resin composition into a desired shape.

From the standpoint of easiness in handling a molded article with a consideration of productivity, moldability, etc. the content proportion of the thermoplastic resin as component (A) and white pigment as component (B) is preferably 65:35 to 90:10, in terms of a weight ratio of the latter to the former, and is more preferably 80:20 to 90:10 in further consideration of the balance between reflectance, light shielding effect and moldability.

In the present invention, the composition composed of the thermoplastic resin (A) and the white pigment (B) must further contain a combination of a black coloring material and a blue coloring material as component (C). By the incorporation of both black coloring material and blue coloring material, a reduction of the reflectance (Y value) can be prevented and also a higher light shielding effect (a lower entire light ray transmittance) is obtainable as compared with the case in which only a black coloring material is incorporated. Here, the color of the coloring material is as defined by Munsell color system using light source C in accordance with JIS Z8721. The black color is N1.5 and is in the range specified by N=neutral and H=±50 with V/C being V<2 and C≦0.5. The blue color is 10B 5/6 and is in the range specified by H=±10 with V/C being V=±0.5 and C=±2.

Concretely, the black coloring material may be selected from carbon black, lamp black, horn black, black lead, iron black, aniline black, cyanine black and, rest, mixed coloring materials of dyes or pigments which fall within the above specified black range. Carbon black is particularly preferred. The blue coloring material may be selected from phthalocyanine dyes or pigments such as phthalocyanine blue, anthraquinone dyes or pigments, mixed oxide pigments, ultramarine blue, Berlin blue, cobalt blue, dioxazine pigments and threne pigments. Phthalocyanine blue is preferred.

It is preferred that the black coloring material and blue coloring material as component (C) be present in an amount of 0.1 to 50 ppm by mass based on a total mass of component (A) and component (B). When the amount is at least 0.1 ppm by mass, the light shielding effect can be sufficiently improved. When the amount is not greater than 50 ppm by mass, the visual whiteness is apparently maintained and a reduction of the reflectance can be prevented. From the above point of view, the amount is more preferably 1 to 50 ppm by mass. For reasons of ensuring a practically sufficiently high light shielding effect without adversely affecting the reflectance, it is particularly preferred that component (C) be present in an amount of 3 to 30 ppm by mass. The amount may be freely adjustable within the above range in response to the demand for reflectance and light shielding property.

It is also preferred that the content proportion of the black coloring agent and blue coloring agent be from 30:70 to 70:30 in terms of mass ratio. When the amount of the black coloring agent is not greater than 70% by mass based on a total amount of the both coloring materials, a significant reduction of the reflectance due to an improvement of the light shielding property is prevented. On the other hand, when the amount of the blue coloring agent is not greater than 70% by mass, a desired improvement of the light shielding effect can be obtained. Thus, it is preferable to combine the black coloring material and the blue coloring material to provide the above range of the content proportion.

The thermoplastic resin composition preferably has such optical characteristics that a molded article obtained by molding the thermoplastic composition and having a wall thickness of 0.5 mm has an entire light ray transmittance of 0.2 or less and a reflectance (Y-value) of 79 or more. When the entire light ray transmittance exceeds 0.2, the light from a cold cathode tube placed on the backside of a molded article can penetrate therethrough to permit one to visually detect it in a condition maintained in a relatively dark environment. When the Y value is less than 79, the molded article cannot be apparently seen to be visually white but is recognized to be gray or blackish. From the same point of view, it is preferred that an article having a wall thickness of 1.0 mm have a total light ray transmittance of 0.2 or less and a reflectance (Y value) of 90 or more.

Here, the term "entire light ray transmittance" is intended to refer to a transmittance as measured in accordance with a method described in JIS K7105. The term "Y value" is intended to mean a stimulus value Y as determined in the spectrocalorimetry for measuring tristimulus values X, Y and Z of a sample (molded article) in accordance with the method described in JIS K7105. The Y value corresponds to a luminance factor or a visual reflectance. The Y value may be measured using, for example, MS2020 Plus manufactured by Macbeth Inc.

If desired, a stabilizer may be added to the thermoplastic resin composition for the purpose of preventing a reduction of the molecular weight of the polycarbonate resin which might be caused by the incorporation of titanium oxide to the polycarbonate resin. The kind of the stabilizer is not specifically limited. A phosphor-containing compound, an organosiloxane containing an alkoxy group (such as a methoxy group, an ethoxy group, a propoxy group or a butoxy group), an organohydrogensiloxane, an alkoxysilane compound, an epoxy compound may be used as the stabilizer.

Concrete examples of the phosphor-containing compound include (2,4-di-tert-butylphenyl)biphenylene diphosphonite, trimethyl phosphate, a benzylphosphonic acid ester, an organophosphonic acid salt, an organophosphonic acid ester and a dialkyl ester of an alkylphosphonic acid. Concrete examples of the organosiloxane containing an alkoxy group include an organopolysiloxane containing an organoxysilyl group which is bonded to a silicon atom through a divalent hydrocarbyl group.

Concrete examples of the organohydrogensiloxane include polyorganohydrogensiloxane and a terminal-blocked polyorganohydrogensiloxane, etc. Concrete examples of the alkoxysilane compound include methyltrimethoxysilane and an alkylaminosilane. Concrete examples of the epoxy compound include an epoxy resin, epoxidized soybean oil, 3,4-epoxycyclohexylmethyl-3,4-epoxycyclohexane carboxylate, etc.

Of these stabilizers, an organoxiloxane containing an alkoxy group is particularly preferred in view of the fact that the occurrence of silvering during the molding step can be controlled to a relatively low level even when the concentration of titanium oxide in the polycarbonate resin composition is made high. The stabilizers may be used only singly or may be used in combination of two or more thereof. The amount of the polycarbonate resin stabilizer added is preferably 0.001 to 5 parts by mass per 100 parts by mass of a total amount of component (A) and component (B).

For the purpose of decreasing the entire light ray transmittance without almost reducing the Y value of a molded article of the polycarbonate resin composition a light diffusing agent may be added thereto, if desired. As concrete examples of the light diffusing agent, there may be mentioned acryl beads, silica beads, silocone resin beads, glass beads, and, also, hollow beads, indeterminate shaped powder and plate-like shape powder of these materials. The amount of the light diffusing agent is preferably 0.01 to 3 parts by mass per 100 parts by mass of a total amount of component (A) and component (B).

A fluororesin may be also added to the thermoplastic resin composition of the present invention for the purpose of imparting higher flame retardancy thereto, if desired. The fluororesin is preferably a polytetrafluoroethylene having an average molecular weight of at least 500,000 and capable of forming fibrils. A polytetrafluoroethylene capable of forming fibrils can serves to function as a dropping preventing agent (agent for the prevention of dropping the resin when fired).

Here, the term "capability of forming fibrils" is intended to refer to the property of a substance by which it forms fibrils when subjected to shear stresses due to plasticization at a time of kneading or injection molding. Such a property is effective in obtaining high flame retardancy. The polytetrafluoroethylene (PTFE) capable of forming fibrils may be obtained by, for example, polymerizing tetrafluoroethylene in an aqueous solvent in the presence of sodium, potassium or ammonium oxydisulfide at a pressure of about 1 to 100 psi and a temperature of 0 to 200° C., preferably 20 to 100° C.

The constitution of the thermoplastic resin composition of the present invention has been described in the foregoing. In addition to the above-described components, various kinds of fillers, additives, other synthetic resins, elastomers, etc. may be incorporated into the thermoplastic resin composition, if necessary. Specific examples of the filler include fibrous fillers such as glass fibers, carbon fibers, potassium titanate whiskers, mineral fibers and wollastonite, and plate-like fillers such as talc, mica, glass flakes and clay.

Concrete examples of the additive include an antioxidant such as a hindered phenol-type, phosphite-type or phosphate-type antioxidant, a UV absorber such as a benzotriazole-type or benzophenone-type UV absorber, a light stabilizer such as a hindered amine-type light stabilizer, an inside lubricant such as an aliphatic carboxylate-type, paraffin-type, silicone oil-type or polyethylene wax-type lubricant and, rest, a customarily employed flame retardant, flame retardant aid, mold release agent, antistatic agent and coloring agent.

Concrete examples other synthetic resins include a polyester (such as polyethylene terephthalate or polybutylene terephthalate), a polyamide, a polyacrylate, a polyethylene, a polypropylene, a polymethyl methacrylate, a polystyrene, an ABS resin and an AS resin. Concrete examples of the elastomer include an isobutylene-isoprene rubber, a styrene-butadiene rubber, an ethylene-propylene rubber, an acrylic elastomer and a core-shell-type elastomer such as MBS or MAS.

The molded article of the present invention using the above thermoplastic resin composition may be obtained by first obtaining a desired composition using a ribbon blender, a Henschel mixer, a drum tumbler, a single axis screw extruder, a two-axis screw extruder, a coknedaer or a multi-axis screw extruder and, thereafter, molding the resulting composition into a desired shape by injection molding, extrusion molding, rotation molding, etc. The molding temperature may be properly selected from the range of about 260 to 300° C. The temperature of the molds may be properly selected from the range of about 80 to 120° C.

The shape of the molded article may be properly selected according to the object of use thereof. The shapes of these parts are not specifically limited as long as they can be integrally molded and may be properly selected according to the object of use thereof.

EXAMPLES

Examples of the present invention will be described below together with comparative examples. The present invention should not be restricted to these examples in any way.

The raw materials for obtaining the thermoplastic resin compositions of Examples and Comparative Examples are as follows Component (A)
1. TAFLON FN1500 (Trade Name, manufactured by Idemitsu Petrochemical Co., Ltd., bisphenol A-type polycarbonate (PC), Mv=14,500)
2. TAFLON FN1700A (Trade Name, manufactured by Idemitsu Petrochemical Co., Ltd., bisphenol A-type polycarbonate (PC), Mv=18,000)
3. TAFLON FC1700 (Trade Name, manufactured by Idemitsu Petrochemical Co., Ltd., PC-PMDS), Mv=18,000, PDMS content: 3.5% by mass)

Component (B):
4. PF726 (Trade Name, manufactured by Ishihara Sangyo Kaisha Ltd., titanium oxide powder, rutile type, surface acid content: 17 μmol/g, surface base content: 26 μmol/g)

Component (C):
5. SUMITONE CYANIN BLUE GH (Trade Name, manufactured by Sumitomo Fine Chemical Co., Ltd., blue coloring material)
6. Mitsubishi CARBON MA-100 (Trade Name, manufactured by Mitsubishi Chemical Corporation, black coloring material)

(D) Other Components:
7. ADECASTUB PFR (Trade Name, manufactured by Asahi Denka Kogyo Co., Ltd., flame retardant, phenylresorcine polyphosphate)
8. CD076 (Trade Name, manufactured by Asahi Glass Fluoropolymers Co., Ltd., polytetrafluoroethylene (PTFE),
9. JC263 (manufactured by Johoku Chemical Co., Ltd., phosphoric acid-based antioxidant, triphenylphosphine)
10. BY16-161 (Trade Name, manufactured by Dow Corning Toray Co., Ltd., stabilizer, ethoxysilicone having ethoxy groups bonded to silicon atoms through hydrocarbyl groups)

Examples 1 to 18

A polycarbonate resin (PC) or a mixture of PC with a polycarbonate-polydimethyl copolymer was used as a thermoplastic resin. This was blended with titanium oxide powder, coloring materials of both blue and black coloring materials, a stabilizer and, as necessary, PTFE and/or an antioxidant in amounts shown in Table 1 and Table 2. The resulting formulation was dry-blended and then kneaded at a cylinder temperature of 280° C. using a two-axis extruder provided with a vent (TEM-35 manufactured by Toshiba Machine Co., Ltd.) to obtain pellets composed of respective polycarbonate resin compositions.

The thus obtained pellets were dried at 120° C. for 5 hours and then test specimens were obtained in the form of flat plates with sizes of 80 mm×80 mm×0.5 mm and 80 mm×80 mm×1.0 mm in each Example by injection molding at a molding temperature of 280° C. and a molding die temperature of 80° C. The molding die used for the preparation of the test specimens had forming surfaces mirror-finished using wet paper (#1000).

Each of the test specimens was measured for its entire light ray transmittance, Y value and lack of hiding. The results are summarized in Tables 1 and 2.

Entire Light Ray Transmittance

Entire light ray transmittance was measured using SZ Sigma 90 manufactured by Nihon Denshoku Kogyo Co., Ltd.

Y Value

Y value was measured using MS2020 Plus manufactured by Macbeth Inc.

Lack of Hiding

Lack of hiding was measured by placing a cold cathode tube having a diameter of 4 mm (HMB manufactured by Harison Electric Company Ltd., luminance: 20,000 cd/m$^2$) in contact with the backside of the molded article (flat plate) and visually evaluated according to the following ratings:

○: not see through

Δ: slightly see through x: significantly see through

Comparative Examples 1 to 11

A polycarbonate resin was used as a thermoplastic resin. This was blended with titanium oxide powder and a stabilizer in amounts shown in Table 1 without the addition of blue and black coloring materials or with addition of only one of blue and black coloring materials. Using respective formulations, pellets were prepared and evaluation was made in the same manner as that in Examples 1 to 18. The results are shown in Tables 1 and 2.

TABLE 1

Table 1-1

| | Product Name | Manufacturer | Name of Substance | Unit | Comparative Example 1 | Comparative Example 2 | Comparative Example 3 | Example 1 |
|---|---|---|---|---|---|---|---|---|
| A | FN1500 | Idemitsu Petrochemical | PC | parts by weight | 80 | 80 | 80 | 80 |
|   | FN1700A | Idemitsu Petrochemical | PC | | | | | |
|   | FC1700 | Idemitsu Petrochemical | PC-PDMS | | | | | |
| B | PF726 | Ishihara Sangyo | Titanium oxide | parts by weight | 20 | 20 | 20 | 20 |
| C | Sumitone CyanineBlue-GH | Sumitomo Fine Chemical | Blue coloring material | ppm | | | 2 | 0.5 |
|   | Mitsubishi Carbon MA-100 | Mitsubishi Chemical | Black coloring material | | | 3 | | 1 |
| Others | PFR | Asahi Denka | Flame retardant | parts by weight | | | | |
|   | CD076 | Asahi Glass Fluoropolymer | PTFE | | | | | |
|   | JC263 | Johoku Chemical | Antioxidant | | | | | |
|   | BY16-161 | Dow Corning Toray | Stabilizer | | 0.8 | 0.8 | 0.8 | 0.8 |
| Results of Evaluation | (0.5 mmt) Total light ray transmittance | | | % | 0.35 | 0.29 | 0.31 | 0.20 |
|   | (0.5 mmt) Reflectance Y | | | | 96.20 | 93.11 | 96.03 | 95.31 |
|   | Visual evaluation (lack of hiding) | | | | x | Δ | x | ○ |

| | Product Name | Manufacturer | Name of Substance | Unit | Example 2 | Example 3 | Comparative Example 4 | Example 4 |
|---|---|---|---|---|---|---|---|---|
| A | FN1500 | Idemitsu Petrochemical | PC | parts by weight | 80 | 80 | 80 | 80 |
|   | FN1700A | Idemitsu Petrochemical | PC | | | | | |
|   | FC1700 | Idemitsu Petrochemical | PC-PDMS | | | | | |
| B | PF726 | Ishihara Sangyo | Titanium oxide | parts by weight | 20 | 20 | 20 | 20 |
| C | Sumitone CyanineBlue-GH | Sumitomo Fine Chemical | Blue coloring material | ppm | 1 | 2 | | 7 |
|   | Mitsubishi Carbon MA-100 | Mitsubishi Chemical | Black coloring material | | 2 | 3 | 8 | 8 |
| Others | PFR | Asahi Denka | Flame retardant | part by weight | | | | |
|   | CD076 | Asahi Glass Fluoropolymer | PTFE | | | | | |
|   | JC263 | Johoku Chemical | Antioxidant | | | | | |
|   | BY16-161 | Dow Corning Toray | Stabilizer | | 0.8 | 0.8 | 0.8 | 0.8 |
| Results of Evaluation | (0.5 mmt) Total light ray transmittance | | | % | 0.12 | 0.00 | 0.21 | 0.00 |
|   | (0.5 mmt) Reflectance Y | | | | 94.26 | 92.99 | 88.94 | 88.86 |
|   | Visual evaluation (lack of hiding) | | | | ○ | ○ | Δ | ○ |

TABLE 2

Table 1-2

| | Product Name | Manufacturer | Name of Substance | Unit | Example 5 | Example 6 | Example 7 | Example 8 |
|---|---|---|---|---|---|---|---|---|
| A | FN1500 | Idemitsu Petrochemical | PC | parts by weight | 80 | 65 | 20 | 20 |
|   | FN1700A | Idemitsu Petrochemical | PC | | | | | |
|   | FC1700 | Idemitsu Petrochemical | PC-PDMS | | | | 60 | 60 |
| B | PF726 | Ishihara Sangyo | Titanium oxide | parts by weight | 20 | 35 | 20 | 20 |
| C | Sumitone CyanineBlue-GH | Sumitomo Fine Chemical | Blue coloring material | ppm | 14 | 2 | 14 | 20 |
|   | Mitsubishi Carbon MA-100 | Mitsubishi Chemical | Black coloring material | | 16 | 3 | 16 | 30 |
| Others | PFR | Asahi Denka | Flame retardant | parts by weight | | | | |
|   | CD076 | Asahi Glass Fluoropolymer | PTFE | | | | 0.3 | 0.3 |
|   | JC263 | Johoku Chemical | Antioxidant | | | | 0.1 | 0.1 |
|   | BY16-161 | Dow Corning Toray | Stabilizer | | 0.8 | 1.2 | 0.8 | 0.8 |
| Results of | (0.5 mmt) Total light ray transmittance | | | % | 0.00 | 0.00 | 0.00 | 0.00 |

TABLE 2-continued

Table 1-2

| | | | | | | | | | |
|---|---|---|---|---|---|---|---|---|---|
| Evaluation | (0.5 mmt) Reflectance Y | | | | | 84.83 | 94.80 | 84.85 | 79.30 |
| | Visual evaluation (lack of hiding) | | | | | ○ | ○ | ○ | ○ |

| | Product Name | Manufacturer | Name of Substance | Unit | Comparative Example 5 | Comparative Example 6 | Comparative Example 7 | Comparative Example 8 |
|---|---|---|---|---|---|---|---|---|
| A | FN1500 | Idemitsu Petrochemical | PC | parts by weight | 95 | 90 | 90 | 90 |
| | FN1700A | Idemitsu Petrochemical | PC | | | | | |
| | FC1700 | Idemitsu Petrochemical | PC-PDMS | | | | | |
| B | PF726 | Ishihara Sangyo | Titanium oxide | parts by weight | 5 | 10 | 10 | 10 |
| C | Sumitone CyanineBlue-GH | Sumitomo Fine Chemical | Blue coloring material | ppm | | | | 2 |
| | Mitsubishi Carbon MA-100 | Mitsubishi Chemical | Black coloring material | | | | 3 | |
| Others | PFR | Asahi Denka | Flame retardant | part by weight | | | | |
| | CD076 | Asahi Glass Fluoropolymer | PTFE | | | | | |
| | JC263 | Johoku Chemical | Antioxidant | | | | | |
| | BY16-161 | Dow Corning Toray | Stabilizer | | 0.2 | 0.4 | 0.4 | 0.4 |
| Results of Evaluation | (0.5 mmt) Total light ray transmittance | | | % | 0.83 | 0.48 | 0.33 | 0.42 |
| | (0.5 mmt) Reflectance Y | | | | 93.21 | 94.50 | 90.31 | 94.37 |
| | Visual evaluation (lack of hiding) | | | | x | x | Δ | x |

TABLE 3

Table 1-3

| | Product Name | Manufacturer | Name of Substance | Unit | Comparative Example 9 | Example 9 | Comparative Example 10 | Example 10 | Example 11 |
|---|---|---|---|---|---|---|---|---|---|
| A | FN1500 | Idemitsu Petrochemical | PC | parts by weight | 90 | 90 | 90 | 90 | 58 |
| | FN1700A | Idemitsu Petrochemical | PC | | | | | | 30 |
| | FC1700 | Idemitsu Petrochemical | PC-PDMS | | | | | | |
| B | PF726 | Ishihara Sangyo | Titanium oxide | parts by weight | 10 | 10 | 10 | 10 | 10 |
| C | Sumitone CyanineBlue-GH | Sumitomo Fine Chemical | Blue coloring material | ppm | | 7 | | 14 | 4 |
| | Mitsubishi Carbon MA-100 | Mitsubishi Chemical | Black coloring material | | 8 | 8 | 16 | 16 | 8 |
| Others | PFR | Asahi Denka | Flame retardant | parts by weight | | | | | 2 |
| | CD076 | Asahi Glass Fluoropolymer | PTFE | | | | | | |
| | JC263 | Johoku Chemical | Antioxidant | | | | | | 0.1 |
| | BY16-161 | Dow Corning Toray | Stabilizer | | 0.4 | 0.4 | 0.4 | 04 | 0.4 |
| Results of Evaluation | (0.5 mmt) Total light ray transmittance | | | % | 0.23 | 0.00 | 0.00 | 0.00 | 0.00 |
| | (0.5 mmt) Reflectance Y | | | | 85.73 | 85.57 | 81.60 | 81.52 | 85.58 |
| | Visual evaluation (lack of hiding) | | | | Δ | ○ | ○ | ○ | ○ |

TABLE 4

Table 2

| | Product Name | Manufacturer | Name of Substance | Unit | Comparative Example 11 | Example 12 | Example 13 | Example 14 |
|---|---|---|---|---|---|---|---|---|
| A | FN1500 | Idemitsu Petrochemical | PC | parts by weight | 80 | 80 | 80 | 80 |
| | FN1700A | Idemitsu Petrochemical | PC | | | | | |
| | FC1700 | Idemitsu Petrochemical | PC-PDMS | | | | | |
| B | PF726 | Ishihara Sangyo | Titanium oxide | parts by weight | 20 | 20 | 20 | 20 |
| C | Sumitone CyanineBlue-GH | Sumitomo Fine Chemical | Blue coloring material | ppm | | 0.5 | 0.1 | 0.3 |
| | Mitsubishi Carbon MA-100 | Mitsubishi Chemical | Black coloring material | | | 1 | 0.2 | 0.4 |
| Others | PFR | Asahi Denka | Flame retardant | parts by weight | | | | |
| | CD076 | Asahi Glass Fluoropolymer | PTFE | | | | | |
| | JC263 | Johoku Chemical | Antioxidant | | | | | |
| | BY16-161 | Dow Corning Toray | Stabilizer | | 0.8 | 08 | 0.8 | 0.8 |
| Results of Evaluation | (0.5 mmt) Total light ray transmittance | | | % | 0.21 | 0.00 | 0.18 | 0.12 |
| | (0.5 mmt) Reflectance Y | | | | 96.28 | 94.29 | 96.19 | 96.10 |
| | Visual evaluation (lack of hiding) | | | | Δ | ○ | ○ | ○ |

TABLE 4-continued

Table 2

|   | Product Name | Manufacturer | Name of Substance | Unit | Example 15 | Example 16 | Example 17 | Example 18 |
|---|---|---|---|---|---|---|---|---|
| A | FN1500 | Idemitsu Petrochemical | PC | parts by weight | 80 | 20 | 20 | 90 |
|   | FN1700A | Idemitsu Petrochemical | PC |  |  |  |  |  |
|   | FC1700 | Idemitsu Petrochemical | PC-PDMS |  |  | 60 | 60 |  |
| B | PF726 | Ishihara Sangyo | Titanium oxide | parts by weight | 20 | 20 | 20 | 10 |
| C | Sumitone CyanineBlue-GH | Sumitomo Fine Chemical | Blue coloring material | ppm | 0.7 | 0.1 | 0.3 | 0.3 |
|   | Mitsubishi Carbon MA-100 | Mitsubishi Chemical | Black coloring material |  | 0.8 | 0.2 | 0.4 | 0.4 |
| Others | PFR | Asahi Denka | Flame retardant | part by weight |  |  |  |  |
|   | CD076 | Asahi Glass Fluoropolymer | PTFE |  |  |  |  |  |
|   | JC263 | Johoku Chemical | Antioxidant |  |  |  |  |  |
|   | BY16-161 | Dow Corning Toray | Stabilizer |  | 0.8 | 0.8 | 0.8 | 0.8 |
| Results of Evaluation | (0.5 mmt) Total light ray transmittance |  |  | % | 0.00 | 0.17 | 0.11 | 0.20 |
|   | (0.5 mmt) Reflectance Y |  |  |  | 95.89 | 96.27 | 96.08 | 94.31 |
|   | Visual evaluation (lack of hiding) |  |  |  | ○ | ○ | ○ | ○ |

The composition according to the present invention can afford a molded article having a high light shielding effect, without an increase of the amount of added titanium oxide, while maintaining a satisfactory Y value (reflectance). For this reason, molding failures such as silvering and foaming can be reduced. Further, it is possible to omit a complicated step of applying a black tape to a molded article or combining white and black molded articles together for the purpose of preventing lack of hiding of a thin walled portion of a molded article which is required to show light reflectance and light shielding properties at the same time.

INDUSTRIAL APPLICABILITY

The thermoplastic resin composition of the present invention can be effectively applied to articles which are required to show light reflectance and light shielding properties at the same time, such as parts of liquid crystal display backlights (reflecting plates, frames, lamp supports, etc.), general illuminator parts (housings, reflecting plates, frames, etc.), LED reflecting cases and operating panels of automobiles.

The invention claimed is:

1. A thermoplastic resin composition, consisting of:
(A) a polycarbonate;
(B) a white pigment;
(C) a black coloring material;
(D) a blue coloring material; and
(E) an organosiloxane comprising an alkoxy group;
wherein:
a mass ratio of component (A) to component (B) is from 50:50 to 90:10;
component (C) and component (D) are present in a combined amount of 0.1 to 50 ppm by mass based on a total mass of component (A) and component (B);
a mass ratio of component (C) to component (D) is from 30:70 to 70:30; and
component (E) is present in an amount of 0.001 to 5 parts by mass based on 100 parts by mass of component (A) and component (B) together.

2. A thermoplastic resin composition of claim 1, wherein the white pigment of component (B) consists of a titanium oxide powder.

3. A thermoplastic resin composition of claim 1, wherein:
the blue coloring material of component (C) consists of phthalocyanine blue; and
the black coloring material of component (D) consists of carbon black.

4. A molded article obtained by molding the thermoplastic resin composition of claim 1; wherein:
the molded article has a wall thickness of 0.5 mm;
the molded article has an entire light ray transmittance of 0.2 or less; and
the molded article has a reflectance (Y value) of 79 or more.

5. A molded article obtained by molding the thermoplastic resin composition of claim 1, wherein:
the molded article has a wall thickness of 1.0 mm;
the molded article has an entire light ray transmittance of 0.2 or less; and
the molded article has a reflectance (Y value) of 90 or more.

6. A liquid crystal display comprising the molded article of claim 4.

7. A thermoplastic resin composition, consisting of:
(A) a polycarbonate;
(B) a white pigment;
(C) a black coloring material;
(D) a blue coloring material;
(E) an organosiloxane comprising an alkoxy group;
(F) a hindered phenol or phosphite antioxidant; and
(G) a fluororesin;
wherein:
a mass ratio of component (A) to component (B) is from 50:50 to 90:10;
component (C) and component (D) are present in a combined amount of 0.1 to 50 ppm by mass based on a total mass of component (A) and component (B);
a mass ratio of component (C) to component (D) is from 30:70 to 70:30; and
component (E) is present in an amount of 0.001 to 5 parts by mass based on 100 parts by mass of component (A) and component (B) together.

8. A thermoplastic resin composition of claim 7, wherein the white pigment of component (B) consists of a titanium oxide powder.

9. A thermoplastic resin composition of claim 7, wherein:
the blue coloring material of component (C) consists of phthalocyanine blue; and
the black coloring material of component (D) consists of carbon black.

10. A molded article obtained by molding the thermoplastic resin composition of claim 7; wherein:
the molded article has a wall thickness of 0.5 mm;

the molded article has an entire light ray transmittance of 0.2 or less; and the molded article has a reflectance (Y value) of 79 or more.

11. A molded article obtained by molding the thermoplastic resin composition of claim 7, wherein:

the molded article has a wall thickness of 1.0 mm;

the molded article has an entire light ray transmittance of 0.2 or less; and the molded article has a reflectance (Y value) of 90 or more.

12. A liquid crystal display comprising the molded article of claim 10.

13. A thermoplastic resin composition, consisting essentially of:

(A) a thermoplastic resin comprising a polycarbonate;

(B) a white pigment;

(C) a black coloring material;

(D) a blue coloring material;

(E) an organosiloxane comprising an alkoxy group;

(F) a hindered phenol or phosphite antioxidant; and (G) a fluororesin;

wherein:

a mass ratio of component (A) to component (B) is from 50:50 to 90:10;

component (C) and component (D) are present in a combined amount of 0.1 to 50 ppm by mass based on a total mass of component (A) and component (B);

a mass ratio of component (C) to component (D) is from 30:70 to 70:30; and component (E) is present in an amount of 0.001 to 5 parts by mass based on 100 parts by mass of component (A) and component (B) together.

14. A thermoplastic resin composition of claim 13, wherein the white pigment of component (B) comprises a titanium oxide powder.

15. A thermoplastic resin composition of claim 13, wherein:

the blue coloring material of component (C) comprises phthalocyanine blue; and the black coloring material of component (D) comprises carbon black.

16. A molded article obtained by molding the thermoplastic resin composition of claim 13; wherein:

the molded article has a wall thickness of 0.5 mm;

the molded article has an entire light ray transmittance of 0.2 or less; and the molded article has a reflectance (Y value) of 79 or more.

17. A molded article obtained by molding the thermoplastic resin composition of claim 13, wherein:

the molded article has a wall thickness of 1.0 mm;

the molded article has an entire light ray transmittance of 0.2 or less; and the molded article has a reflectance (Y value) of 90 or more.

18. A liquid crystal display comprising the molded article of claim 16.

* * * * *